E. Kendall,
Piston Packing.

N°. 48,692.  Patented July 11, 1865.

Witnesses:
C. D. Smith
W. F. Hall

Inventor:
Edwin Kendall.
By Munn & Co.
Attorneys.

UNITED STATES PATENT OFFICE.

EDWIN KENDALL, OF NEW LEBANON, NEW YORK.

IMPROVEMENT IN PISTON-PACKING.

Specification forming part of Letters Patent No. 48,692, dated July 11, 1865.

*To all whom it may concern:*

Be it known that I, EDWIN KENDALL, of New Lebanon, in the county of Columbia and State of New York, have invented a new and useful Improvement in Pistons for Steam-Engines; and I do hereby declare the following to be a full and exact description of the same, reference being had to the accompanying drawings, making part of this specification, in which—

Figure 1:
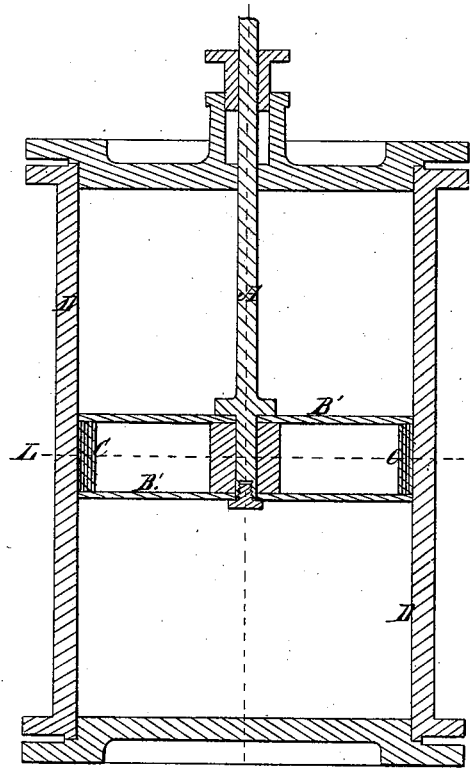
Figure 2:
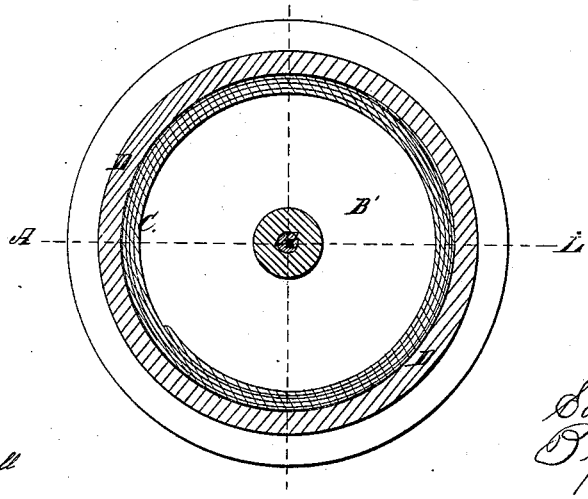

Figure 1 is a longitudinal section of a cylinder and a central section of the piston constructed upon my improved plan. Fig. 2 is a transverse section of the same.

Similar letters of reference indicate corresponding parts in the two figures.

The subject of my invention is a piston whose packing consists of a coiled or helical spring which is placed between the two piston-heads in such manner as to be capable of expanding for the purpose of producing a tight joint between itself and the walls of the cylinder. By my invention a simple and inexpensive packing is provided, and one which will subserve the desired end in a much more perfect manner than the expedients commonly resorted to.

To enable others skilled in the art to which my invention appertains to fully understand and use the same, I will proceed to describe it with reference to the accompanying drawings.

A represents a piston-rod, and B B' the piston-heads. The head B on the end of the piston-rod is secured in position by means of a screw-bolt, or otherwise, to admit of its removal for the application of the coiled spring C, which is made of brass or any other suitable material which will expand when coiled, like the mainspring of a watch. D represents the cylinder of the steam-engine, which, being of any known construction, needs no specific description. The spring or packing C, when secured between the heads B B' and in position within the cylinder, expands outwardly and forms a tight joint between the piston and the walls of the cylinder. The end of the spring which is on the outside or next the cylinder should be tapered to a point or flat edge in such a way as to make it fit snugly against the cylinder, and thus the external coil impinges all round against the walls of the cylinder and prevents the passage of steam.

To apply the packing to the piston-rod the piston-head B is first detached and the spring C wound upon a form small enough to enter the cylinder freely. On being passed into the cylinder the spring C is bound in a contracted condition by a wire, and after the spring is fixed upon the rod A against the head B' the wire is withdrawn. The piston-rod A, with one head, B', carries the spring to the far end of the cylinder, and then the other head, B, is secured in its position on the end of the rod. In this manner the spring C is fixed between the heads B B', and when thus applied it constitutes a packing of a highly superior character, not being liable to become deranged under ordinary usage.

Any substance may be employed for making the spring C, but brass is preferred, because of the facility with which it may be rolled into the required form.

Having thus described my invention, the following is what I claim as new and desire to secure by Letters Patent:

A packing for pistons consisting of a coiled spring, C, secured between the heads B B', and adapted to operate substantially as herein described.

EDWIN KENDALL.

In presence of—
PARDER CARPENTER,
HENRY D. GAY.